(12) United States Patent
Wang

(10) Patent No.: US 10,661,733 B2
(45) Date of Patent: May 26, 2020

(54) INTERACTION METHOD, INTERACTION APPARATUS AND VEHICLE-MOUNTED DEVICE

(71) Applicant: Beijing Zhigu Rui Tuo Tech Co., Ltd., Beijing (CN)

(72) Inventor: Zhengxiang Wang, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 886 days.

(21) Appl. No.: 15/251,052

(22) Filed: Aug. 30, 2016

(65) Prior Publication Data
US 2017/0088066 A1    Mar. 30, 2017

(30) Foreign Application Priority Data

Sep. 28, 2015 (CN) .......................... 2015 1 0628497

(51) Int. Cl.
| | |
|---|---|
| *B60R 16/027* | (2006.01) |
| *B60K 37/06* | (2006.01) |
| *G06F 3/0487* | (2013.01) |
| *G06F 3/0488* | (2013.01) |
| *G06F 3/0484* | (2013.01) |
| *G06F 3/041* | (2006.01) |

(Continued)

(52) U.S. Cl.
CPC ............ *B60R 16/027* (2013.01); *B60K 37/00* (2013.01); *B60K 37/06* (2013.01); *G06F 3/017* (2013.01); *G06F 3/03* (2013.01); *G06F 3/0414* (2013.01); *G06F 3/0487* (2013.01); *G06F 3/04842* (2013.01); *G06F 3/04883* (2013.01); *B60K 2370/143* (2019.05); *B60K 2370/16* (2019.05); *B60K 2370/52* (2019.05); *B60K 2370/782* (2019.05); *B62D 1/06* (2013.01); *G06F 2203/04806* (2013.01); *G06K 9/00825* (2013.01)

(58) Field of Classification Search
None
See application file for complete search history.

(56) References Cited

U.S. PATENT DOCUMENTS

| | | | | |
|---|---|---|---|---|
| 2012/0326735 | A1* | 12/2012 | Bennett .................. | B62D 1/046 324/705 |
| 2014/0090505 | A1* | 4/2014 | Okuyama ............. | G06F 3/0219 74/485 |

(Continued)

FOREIGN PATENT DOCUMENTS

| | | |
|---|---|---|
| CN | 104044627 | 9/2014 |
| CN | 104854553 | 8/2015 |

(Continued)

*Primary Examiner* — Duane N Taylor, Jr.
(74) *Attorney, Agent, or Firm* — Sheppard Mullin Richter & Hampton LLP

(57) ABSTRACT

Embodiments of the present invention provide an interaction method, an interaction apparatus and a vehicle-mounted device. The interaction method comprises: determining a holding position of at least one first hand and a holding pressure of at least one second hand on a steering wheel of a vehicle; and at least according to the holding position of the at least one first hand and the holding pressure of the at least one second hand, determining a target relative position. The embodiments of the present invention provide an interaction solution.

37 Claims, 6 Drawing Sheets

(51) Int. Cl.
*G06F 3/01* (2006.01)
*B60K 37/00* (2006.01)
*G06F 3/03* (2006.01)
*B62D 1/06* (2006.01)
*G06K 9/00* (2006.01)

(56) References Cited

U.S. PATENT DOCUMENTS

| | | | |
|---|---|---|---|
| 2014/0156107 A1* | 6/2014 | Karasawa | G01C 21/3664 701/1 |
| 2014/0277951 A1 | 9/2014 | Kim | |
| 2016/0320835 A1* | 11/2016 | Kuehne | B60K 37/00 |

FOREIGN PATENT DOCUMENTS

| | | |
|---|---|---|
| JP | H09156512 | 6/1997 |
| WO | WO2014126999 | 8/2014 |

\* cited by examiner

INTERACTION METHOD, INTERACTION APPARATUS AND VEHICLE-MOUNTED DEVICE

BACKGROUND

Technical Field

The present invention relates to the field of interaction technology, in particular to an interaction method, an interaction apparatus and a vehicle-mounted device.

Related Art

When a user drives a vehicle, the user possibly wants to select a certain object outside a vehicle in a sight range, such as a front vehicle, to perform communication between the vehicles or query information. In the prior art, the object that the user wants to select can be determined by a sight tracking technology, but the sight tracking technology has certain errors, and the precision of recognizing the object can be improved only by increasing time when the user gazes the object, while such action increases a drive risk in a driving process.

SUMMARY

In view of this, an objective of embodiments of the present invention is to provide an interaction solution.

To achieve the objective, according to a first aspect of the embodiments of the present invention, an interaction method is provided, including:

determining a holding position of at least one first hand and a holding pressure of at least one second hand on a steering wheel of a vehicle; and at least according to the holding position of the at least one first hand and the holding pressure of the at least one second hand, determining a target relative position.

To achieve the objective, according to a second aspect of the embodiments of the present invention, an interaction apparatus is provided, including:

a first determining module, configured to determine a holding position of at least one first hand and a holding pressure of at least one second hand on a steering wheel of a vehicle; and a second determining module, configured to, at least according to the holding position of the at least one first hand and the holding pressure of the at least one second hand, determine a target relative position.

To achieve the objective, according to a third aspect of the embodiments of the present invention, a vehicle-mounted device is provided, including:

a holding detection module, configured to detect a holding position of at least one first hand and a holding pressure of at least one second hand on a steering wheel;

a memory, configured to store an instruction;

a processor, configured to execute the instruction stored by the memory, where the instruction causes the processor to execute the following operation:

at least according to the holding position of the at least one first hand and the holding pressure of the at least one second hand, determining a target relative position.

At least one of the technical solutions has the following beneficial effects:

By determining a holding position of at least one first hand and a holding pressure of at least one second hand on a steering wheel of a vehicle; and at least according to the holding position of the at least one first hand and the holding pressure of the at least one second hand, determining a target relative position, an interaction solution is provided, specifically, a target position that a user wants to select is determined according to the holding position and the holding pressure that the user holds the steering wheel without excessively increasing a burden of the user, and the driving safety is improved.

DETAILED DESCRIPTION

Specific implementing manners of the present application are further described in detail in combination with drawings and embodiments. The following embodiments are used for explain the present invention rather than limiting a scope of the present invention.

Figure 1:
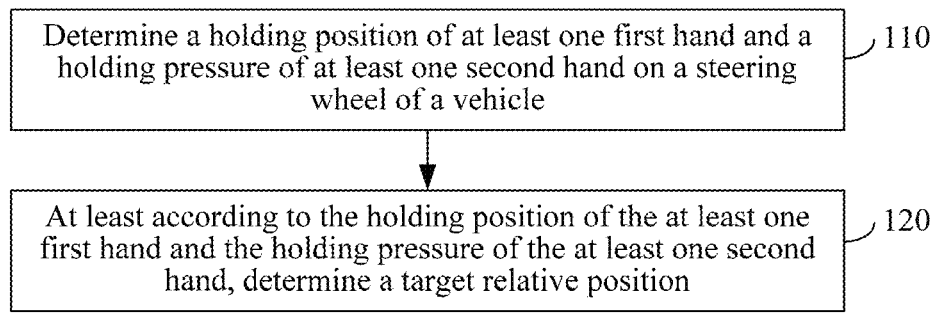
FIG. 1 is a flow schematic diagram of an interaction method embodiment provided by the present invention.

FIG. 1 is a flow schematic diagram of an interaction method embodiment provided by the present invention. As shown in FIG. 1, the present embodiment comprises:

110: determining a holding position of at least one first hand and a holding pressure of at least one second hand on a steering wheel of a vehicle.

For example, an interaction apparatus according to the interaction apparatus embodiment of the present invention, or a vehicle-mounted device according to the vehicle-mounted device embodiment of the present invention serves as an executing main body of the present embodiment to execute 110-120.

In the present embodiment, the vehicle can be a vehicle in any type with a steering wheel.

In the present embodiment, the steering wheel is round or approximately round.

In the present embodiment, the at least one first hand and the at least second hand usually belong to a same user, who operates the steering wheel, namely a driver of the vehicle. Optionally, the at least one first hand is one hand of the user, or both hands of the user; the at least one second hand is one hand of the user, or both hands of the user. When the at least first hand is both hands of the user, each hand has one holding position; when the at least second hand is both hands of the user, each hand has at least one holding pressure.

It should be noted that the first hand and second hand are merely intended to differentiate the holding position or holding pressure of the hand, and each hand of the user can be the first hand, or the second and or both the first hand and the second hand. Specifically, the at least one first hand is same as or different from the at least one second hand. For example, in 110, the holding position of one hand and the holding pressure of the two hands of the user on the steering wheel, or the holding position of the two hands and the holding pressure of one hand of the user, or the holding position of the two hands and the holding pressure of the two hands of the user, or the holding position of one hand and the holding pressure of the hand of the user, or the holding position of one hand and the holding pressure of the other hand of the user are determined.

In the present embodiment, there are many manners to determine the holding position of the at least one first hand and a holding pressure of the at least one second hand, for example, at least one pressure sensor is arranged at the edge of the steering wheel, etc.

120: at least according to the holding position of the at least one first hand and the holding pressure of the at least one second hand, determining a target relative position.

In the present embodiment, the target relative position is a relative position of a target position relative to a reference position, and the target relative position is the position that the user with the at least one first hand and at least one second hand wants to select. Specifically, the target position and the reference position can be an object in any type, for example a vehicle, a person, a building or a road.

In the present embodiment, the target relative position is related to the holding position of the at least one first hand and the holding pressure of the at least one second hand, specifically, when the holding position of the at least one first hand and/or the holding pressure of the at least one second hand are different, the determined target relative positions are correspondingly different.

In the present embodiment, by determining a holding position of at least one first hand and a holding pressure of at least one second hand on a steering wheel of a vehicle; and at least according to the holding position of the at least one first hand and the holding pressure of the at least one second hand, determining a target relative position, there is provided an interaction solution, specifically, a target position that a user wants to select is determined according to the holding position and the holding pressure that the user holds the steering wheel without excessively increasing a burden of the user, and the driving safety is improved.

The method of the present embodiment is further described by some optional implementing manners.

In the present embodiment, the holding pressure of the at least one second hand can be the holding pressure of different parts in the at least one second hand.

In one possible scenario, the holding pressure of at least one second hand comprises: a holding pressure of at least one finger of the at least one second hand;

the at least according to the holding position of the at least one first hand and the holding pressure of the at least one second hand, determining a target relative position comprises:

at least according to the holding position of the at least one first hand and the holding pressure of the at least one finger, determining a target relative position.

In the present scenario, the at least one finger is one or more fingers; the at least one second hand is optionally a second hand, the at least one finger belongs to one hand of the user or the at least one second hand is both hands, and the at least one finger belongs to two hands one hand of the user. In the scenario that the at least one belongs to two hands one hand of the user, the at least one finger is more fingers.

In the present scenario, if the at least one finger is more fingers, each finger has a holding pressure per se.

In the present scenario, the target relative position is optionally determined by the relative direction and relative distance of the target position relative to the reference position, correspondingly, the two are respectively determined by the holding position and holding pressure. Optionally, the at least according to the holding position of the at least one first hand and the holding pressure of the at least one finger, determining a target relative position comprises:

at least according to the holding position of the at least one first hand, determining a relative direction of the target relative position; and at least according to the holding pressure of the at least one finger, determining a relative distance of the target relative position.

There are many manners to determine a relative distance of the target relative position at least according to the holding pressure of the at least one finger.

In one optional implementing manner, the at least according to the holding pressure of the at least one finger, determining a relative distance of the target relative position comprises:

at least according to a first number of fingers with the holding pressure exceeding a first threshold in the at least one finger, determining a relative distance of the target relative position.

Specifically, the firs threshold is preset. For example, the at least one finger is four fingers, with holding pressure of P1, P2, P3 and P4, then the firs threshold is Pt, if P1, P2 are larger than Pt and P3 and P4 are smaller than PT, the first number is 2.

Specifically, the finger number and the distance or distance range have certain corresponding relation that can be preset. For example, in the corresponding relation, number 1 corresponds to 10 m, number 2 corresponds to 20 m, number 3 corresponds to 30 m, and so on, if the first number is 2, then the relative distance is 20 m. For another example, in the corresponding relation, number 1 corresponds to 0-10 m, number 2 corresponds to 10-20 m, number 3 corresponds to 20-30 m, and so on, if the first number is 2, then the relative distance is in a 10-20 m range.

In the present implementing manner, the at least one second hand is optionally one hand, then the at least one finger belongs to one hand of the user, or the at least one second hand is two hands of the user, then the at least one finger belongs to two hands of the user. In the scenario that the at least one second hand is two hands of the user, in order to improve a control precision of the user, optionally, the at least according to a first number of fingers with the holding pressure exceeding a first threshold in the at least one finger, determining a relative distance of the target relative position comprises:

in response to that a second number of fingers with the holding pressure exceeding the first threshold in the one of the two second hands equals to a third number of fingers with the holding pressure exceeding the first threshold in the other of the two second hands, at least according to the second number, determining the relative distance.

The sum of the second number and the third number is equal to the first number, since the second number and the third number are equal, the first number is two times of the second number and the third number.

The at least according to the second number, determining the relative distance optionally means that the relative distance is a corresponding distance or distance range of the second number in the corresponding relation between the number of the fingers and the distance or distance range. For example, in the corresponding relation, number 1 corresponds to 10 m, number 2 corresponds to 20 m, number 3 corresponds to 30 m, and so on, correspondingly, if the first number is 4, and the second number and third number are both 2, then the relative distance is determined as 20 m. For another example, in the corresponding relation, number 1 corresponds to 0-10 m, number 2 corresponds to 10-20 m, number 3 corresponds to 20-30 m, and so on, if the first number is 4, and the second number and third number are both 2, then the relative distance is determined to be in a 10-20 m range.

In another optional implementing manner, different from the above implementing manner that the holding pressure of each finger adopts the same threshold, in the implementing manner, the holding pressure of different fingers adopt different thresholds. Correspondingly, the at least according to the holding pressure of the at least one finger, determining a relative distance of the target relative position comprises:

at least according to a fourth number of fingers with the holding pressure exceeding a second threshold in the at least one finger, determining the relative distance.

Specifically, different fingers have different holding pressure, for example, a sequence of the holding pressure of fingers of one hand is the thumb, the index finger, the middle finger, the ring finger and the little finger, the holding of each finger of the right hand of a right-handed user is larger than that of the corresponding finger of the left hand, correspondingly, a threshold corresponding to the holding pressure is set for each finger, for example, the second threshold of the thumb of one hand is smaller than the threshold of the index finger.

In another implementing manner, different from the above two implementing manners that the relative distance is determined according to the number of the fingers with the holding pressure exceeding the threshold, in the present implementing manner, the relative distance is determined directly according to the holding pressure. Correspondingly, the at least according to the holding pressure of the at least one finger, determining a relative distance of the target relative position comprises:

at least according to an average value of the holding pressure of the at least one finger, determining the relative distance.

Specifically, a pressure value and the distance or distance range have certain corresponding relation that can be preset.

Besides the more manners of determining the relative distance at least according to an average value of the holding pressure of the at least one finger, there are many manners to determine a relative direction of the target relative position at least according to the holding position of the at least one first hand. Considering that two hands of the user usually have different holding positions on the steering wheel, correspondingly, the implementing manners of determining the relative direction in the scenarios that the first hand is one first hand or two first hands are different.

In one possible scenario, the at least one first hand is one first hand.

In the present scenario, one optional implementing manner is that the at least according to the holding position of the at least one first hand, determining a relative direction of the target relative position comprises:

determining that the relative direction is a first projection direction of a first direction pointing to the holding position of the first hand from the center of the steering wheel in a driving plane of the vehicle.

Specifically, the driving plane is a horizontal plane or non-horizontal plane optionally.

Figure 2A:
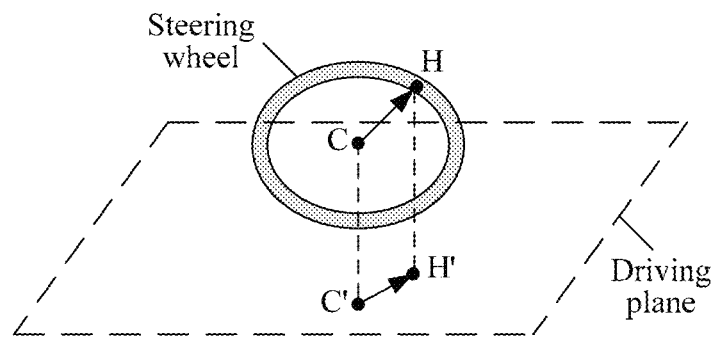
FIG. 2A is a schematic diagram of an opposite direction in the present invention.

FIG. 2A is a schematic diagram of an opposite direction in the present invention. As shown in FIG. 2, the center of the steering wheel is in the C point, the holding position is in the H point on the steering wheel, the first direction points to H from C, the driving plane is a quadrangle defined by the dotted line in the drawing, a projection point of the C point on the driving plane is C', a projection point of the H point on the driving plane is H', and the first projection direction points to H' from C'.

In the present scenario, another optional implementing manner is that the at least according to the holding position of the at least one first hand, determining a relative direction of the target relative position comprises; or according to the first direction, a second direction pointing to a twelve o'clock position of the steering wheel in a vehicle straight driving state from the center of the steering wheel and a driving direction of the vehicle, determining the relative direction, wherein a corresponding relation between the relative direction and the driving direction of the vehicle is same as that between the first direction and the second direction.

The corresponding relation between any two directions comprise an included angle between the two directions and an offset direction between the two directions. Specifically, the first direction and the second direction are in one plane, namely the plane where the steering wheel is, the relative direction and the driving direction of the vehicle are in one plane, namely the driving plane of the vehicle.

Figure 2B:
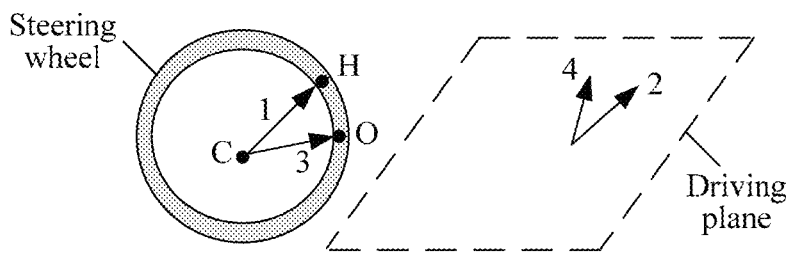
FIG. 2B is another schematic diagram of an opposite direction in the present invention.

FIG. 2B is another schematic diagram of an opposite direction in the present invention. As shown in FIG. 2B, the center of the steering wheel is in the C point, the holding position is in the H point on the steering wheel, the first direction points to H from C and is direction 1, assuming that the vehicle is in a turning driving state, the driving direction is direction 2 in the drawing, that is, the steering wheel is rightwards rotated by certain angle relative to the state that the steering wheel is in the vehicle straight driving state, the twelve o'clock position of the steering wheel in the vehicle straight driving state is as shown in the O point in the drawing, the second direction points to O from C and is direction 3, correspondingly, the relative direction determined based on the same principle of the corresponding relation is as shown in FIG. 4.

In another possible scenario, the at least one first hand is two first hands.

In the present scenario, one possible implementing manner is that the at least according to the holding position of the at least one first hand, determining a relative direction of the target relative position comprises:

determining that the relative direction is between a second projection direction of a third direction pointing to a first holding position of one of the two first hands from the center of the steering wheel and a third projection direction of a fourth direction pointing to a second holding position of the other of the two first hands from the center of the steering wheel in the driving plane.

Specifically, the driving plane is a horizontal plane or non-horizontal plane optionally.

In the present implementing manner, the range of the relative direction is determined to be in the range from the second projection direction to the third projection direction. Specifically, determining of the second projection direction and the third projection direction can refer to the that of the first projection direction shown in FIG. 2A.

In the present scenario, another possible implementing manner is that the at least according to the holding position of the at least one first hand, determining a relative direction of the target relative position comprises:

according to the third direction, the fourth direction and a second direction pointing to a twelve o'clock position of the steering wheel in a vehicle straight driving state from the center of the steering wheel and a driving direction of the vehicle, determining the relative direction, wherein the relative direction is between a fifth direction and a sixth direction, a corresponding relation between the fifth direction and the driving direction of the vehicle is same as that between the third direction and the second direction, and a corresponding relation between the sixth direction and the driving direction of the vehicle is same as that between the fourth direction and the second direction.

In the present implementing manner, the range of the relative direction is determined to be in the range from the fifth projection direction to the sixth projection direction. Specifically, determining of the fifth projection direction and the sixth projection direction can refer to the that of the relative direction shown in FIG. 2B.

Besides the scenario that the holding pressure of the at least one second hand comprises the holding pressure of at least one finger in the at least one second hand, in another possible scenario, the holding pressure of at least one second hand comprises: holding pressure of at least one palm of the at least one second hand;

the at least according to the holding position of the at least one first hand and the holding pressure of the at least one second hand, determining a target relative position comprises:

at least according to the holding position of the at least one first hand and the holding pressure of the at least one palm, determining a target relative position.

In the present scenario, the at least one second hand is optionally one or two second hands, when the at least one second hand is two second hands, each second hand has a palm per se, that is, the at least one palm is two palms, and correspondingly, each palm has holding pressure per se.

In the present scenario, similar to above scenario, the target relative position is optionally determined by the relative direction and relative distance of the target position relative to the reference position, correspondingly, the two are respectively determined by the holding position and holding pressure. Optionally, the at least according to the holding position of the at least one first hand and the holding pressure of the at least one palm, determining a target relative position comprises:

at least according to the holding position of the at least one first hand, determining a relative direction of the target relative position; and at least according to the holding pressure of the at least one palm, determining a relative distance of the target relative position.

There are many manners to determine a relative distance of the target relative position at least according to the holding pressure of the at least one palm. Optionally, the relative distance can be determined directly according to the holding pressure, for example, when the at least one palm is one palm, the relative distance can be determined at least according to the holding pressure of the palm, when the at least one palm is two palms, the relative distance can be determined at least according to an average value of the holding pressure of the two palms, and the pressure size and the distance or distance range have certain corresponding relation that can be preset.

There are many manners to determine a relative direction of the target relative position at least according to the holding position of the at least one first hand, which specifically refer to the corresponding description in the scenario that the holding pressure of the at least one second hand comprises the holding pressure of the at least one finger of the at least one second hand.

In the present embodiment, the holding position of the at least one first hand is optionally the holding position of one first hand and respective holding positions of two first hands. Further, the holding position of each hand can be determined according to the holding positions of different parts of the first hand, for example, the holding position of the palm of one first hand is taken as the holding position of the first hand, and the holding position of one finger of the first hand is taken as the holding position of the first hand, or the center of more holding positions of more fingers of one first hand is taken as the holding position of the first hand.

In the present embodiment, the target positions and reference positions relative to each other in the target relative position have many possibilities.

In one possible scenario, the target relative position is a relative position of a target position outside the vehicle relative to the vehicle, that is, the reference position is the vehicle position. In the present scenario, an entity object such as a person, a building or another vehicle optionally exists in the target position.

In the present scenario, the present embodiment optionally further comprises:

at least according to the target relative position, acquiring an image of the target position.

Figure 3A:
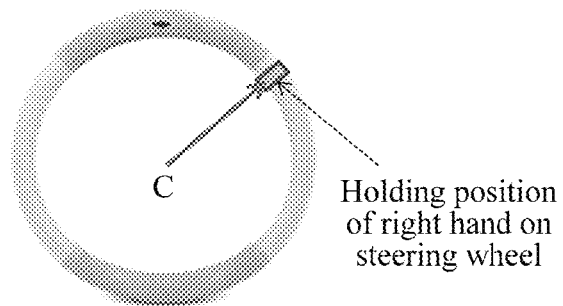
FIG. 3A is a schematic diagram of an application scenario in the present invention.
Figure 3B:
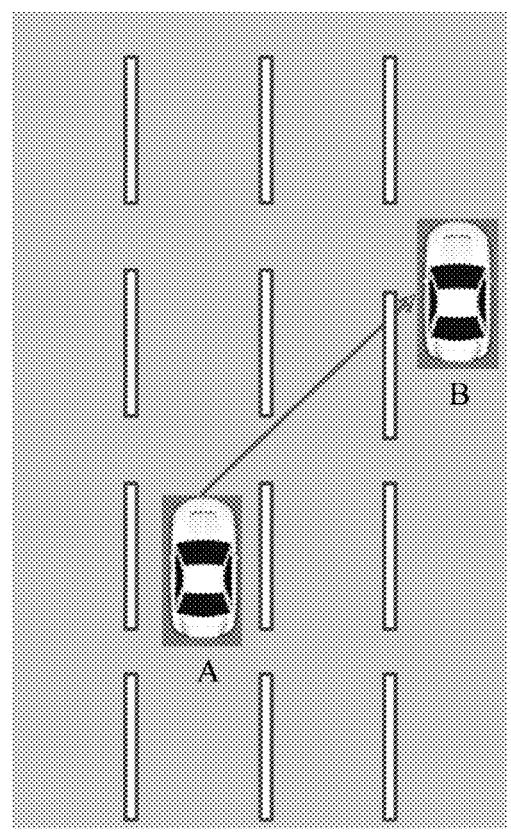
FIG. 3B is a schematic diagram that a right hand of a user is at a holding position on a steering wheel in the application scenario as shown in FIG. 3A.

FIG. 3A is a schematic diagram of an application scenario of the present application, and FIG. 3B is a schematic diagram that a right hand of a user is at a holding position on a steering wheel in the application scenario as shown in FIG. 3A. As shown in FIG. 3A, the user sees a vehicle B at a position of 20 m in the right front direction when straightly driving a vehicle, and wants to learn the vehicle model information of the vehicle B, the user can control the holding position of the right hand on the steering wheel as shown in FIG. 3B, a direction pointing to the holding position from the center C of the steering wheel is consistent with the direction pointing to the vehicle B from the vehicle A, and the user controls the holding pressure of each finger of the right hand on the steering wheel to cause a relative distance corresponding to the number of fingers with the holding pressure exceeding a preset threshold to be 20 m, or a corresponding distance range comprises 20 m; the executing main body of the present embodiment uses the right hand of the user as both the first hand and second hand, the relative position of the target position relative to the vehicle A is determined at least according to the holding position of the right hand of the user on the steering wheel and the holding pressure of each finger, then an image of the target position is acquired and comprises an image of the vehicle B, and further optionally, the vehicle model information of the vehicle B is obtained by analyzing the image of the vehicle B and is present to the user.

In another possible scenario, the target relative position is a relative position of a target position in an electronic map relative to a reference position in a current display region of the electronic map, wherein the current display region of the electronic map is a region in the electronic map presented on a display screen when the executing main body of the present embodiment executes 120; further, the reference position is a center position of the current display region, or the reference position is a position of the vehicle.

Optionally, the electronic map is displayed in a center control screen of the vehicle or a Head UP display (HUD) of the vehicle.

In the present scenario, the present embodiment optionally further comprises: displaying the target position.

Specifically, before the executing main body of the present embodiment executes the step of displaying the target position, the current display region of the electronic map possibly comprises the target position or not, and after executing the step of displaying the target position, the display region of the electronic map comprises the target position.

Further optionally, the displaying the target position comprises: displaying the electronic map in a manner of taking the target position as a center. That is to say, the target position is taken as the center position of the display region of the electronic map.

In the present scenario, the at least one second hand is optionally one hand or two hands of the user.

When the at least one second hand is one hand of the user, the display of the target position can be assisted by the other hand of the user, optionally, the method further comprises:

determining holding pressure of the other hand of the user on the steering wheel;

at least according to the holding pressure of the other hand, determining a target display scale of the target position; and the displaying the target position comprises: displaying the target position according to the target display scale.

Specifically, the holding pressure of the other hand is used for determining the target display scale, correspondingly, the holding pressure of one hand is used for determining the target relative position in 120, therefore, which hand is the first hand and which hand is the second hand should be preset by the user. For example, the hand having the first finger with the holding pressure exceeding the first threshold is taken as the second first hand in advance.

There are many manners to determine a target display scale of the target position at least according to the holding pressure of the other hand. Optionally, the at least according to the holding pressure of the other hand, determining a target display scale of the target position comprises:

at least according to a direction of the holding pressure of the other hand on the steering wheel, determining whether the target display scale is zoomed out or in relative to a current display scale;

at least according to the holding pressure of the other hand, or a number of fingers with the holding pressure exceeding a second threshold in the other hand, determining a zoom factor of the target display scale relative to the current display scale.

The current display scale is the display scale of the electronic map before the executing main body of the present embodiment executes the step of displaying the target position.

The second threshold can be preset.

The pressure size and the times have certain corresponding relation that can be preset.

The finger number and the times have certain corresponding relation that can be preset. For example, number 1 corresponds to times 1, number 2 corresponds to times 2, number 3 corresponds to times 3, and so far, if the first number is 2, then the times are determined as 2, further, if the target display scale is determined to be zoomed out relative to the current display scale, then the target display scale is determined to be zoomed out by 2 times relative to the current display scale, that is, the target display scale is one third of the current display scale, and if the target display scale is determined to be zoomed in relative to the current display scale, then the target display scale is determined to be zoomed in by 2 times relative to the current display scale, that is, the target display scale is three times of the current display scale.

Optionally, a direction of the holding pressure of the other hand on the steering wheel points to the inside from the outside of the steering wheel, that is, the other hand presses the steering wheel inwards, or the direction of the holding pressure of the other hand on the steering wheel points to the outside from the inside of the steering wheel, that is, the other hand pulls the steering wheel outwards. Correspondingly, if the direction responding to the holding pressure of the other hand points to the inside from the outside of the steering wheel, the target display scale is determined to be zoomed out relative to the current display scale, if the direction responding to the holding pressure of the other hand points to the outside from the inside of the steering wheel, the target display scale is determined to be zoomed in relative to the current display scale, or if the direction responding to the holding pressure of the other hand points to the inside from the outside of the steering wheel, the target display scale is determined to be zoomed in relative to the current display scale, and if the direction responding to the holding pressure of the other hand points to the outside from the inside of the steering wheel, the target display scale is determined to be zoomed out relative to the current display scale.

Figure 3C:
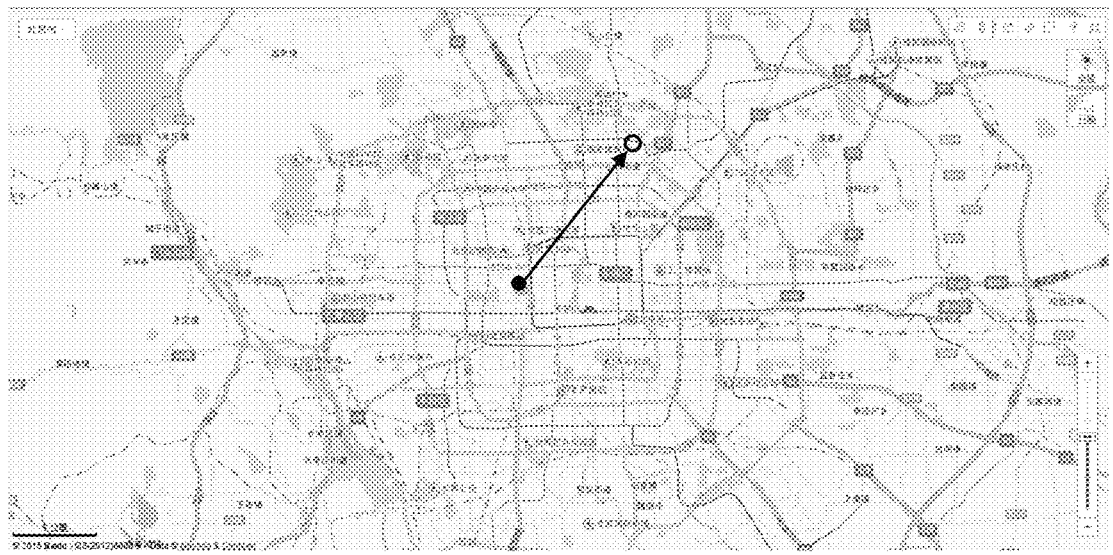
FIGS. 3C-3E are schematic diagrams of a display region in each stage of an electronic map in another application scenario of the present invention.
Figure 3D:
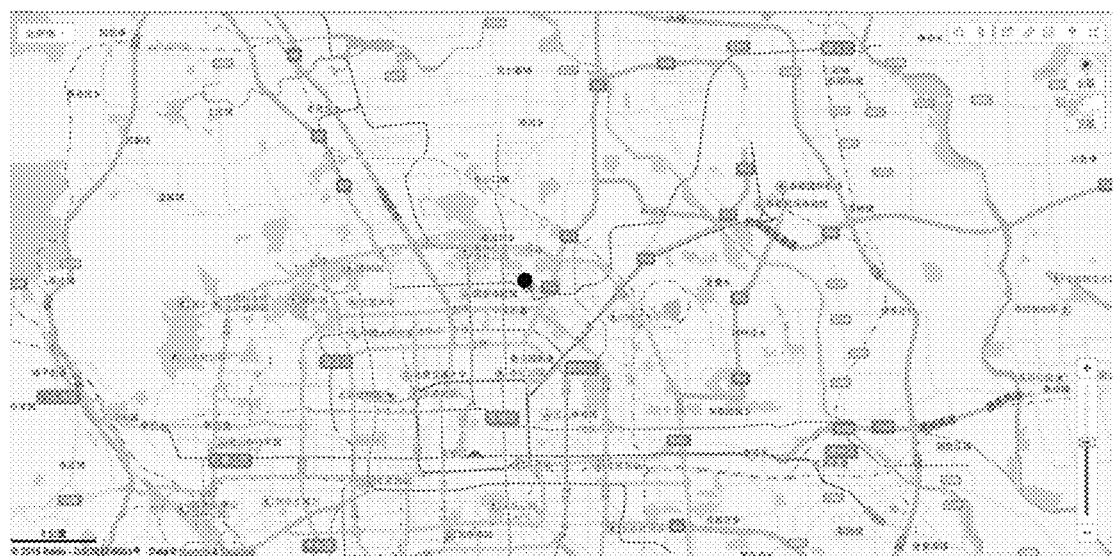
Figure 3E:
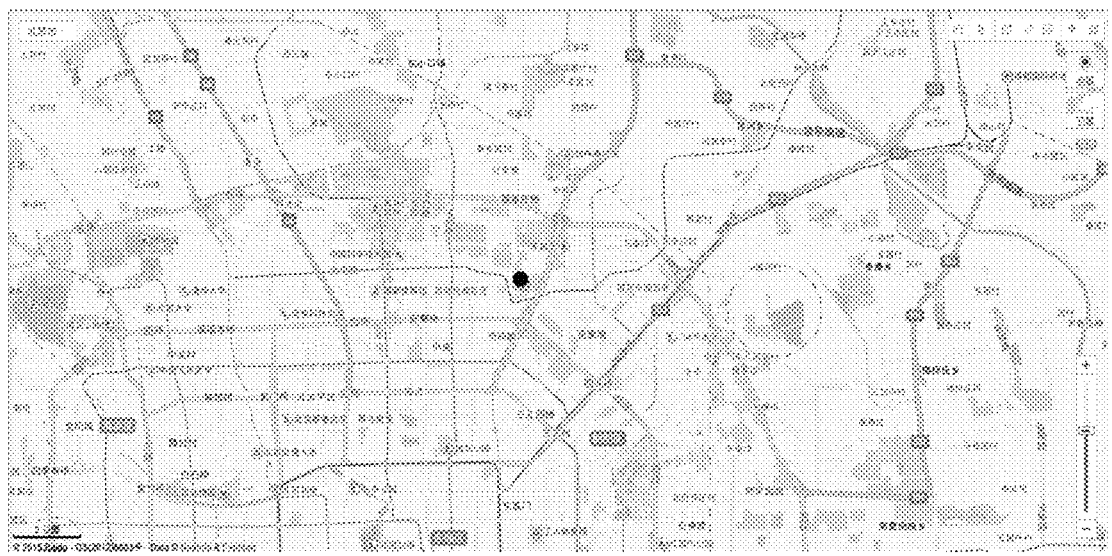
Figure 3F:
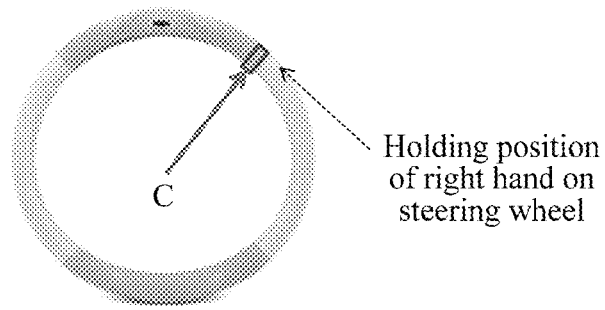
FIG. 3F is a schematic diagram that a right hand of a user is at a holding position on a steering wheel in the application scenario as shown in FIGS. 3C-3E.

FIGS. 3C-3E are schematic diagrams of a display region in each stage of an electronic map in another application scenario of the present invention; FIG. 3F is a schematic diagram of a holding position of a right hand of the user on the steering wheel in the scenario as shown in FIGS. 3C-3E. In the present scenario, the user checks an electronic map on a vehicle A when driving the vehicle A, the display region of the electronic map is the current display region as shown in FIG. 3C, the center position of the current display region is a solid dot as shown in FIG. 3C, if the user wants to check a region right above the dot by 2 cm in the electronic map, as shown by a hollow dot in FIG. 3C, the user can control the holding position of the right hand on the steering wheel to be as shown in FIG. 3F, a direction pointing to the holding position from the center C of the steering wheel is consistent with the direction pointing to the hollow dot from the solid dot in FIG. 3C, the user controls the holding pressure of each finger on the steering wheel to cause a relative distance corresponding to the number of fingers with the holding pressure exceeding a preset threshold to be 2 cm; the executing main body of the present embodiment takes the right hand of the user as the first hand and the second hand, at least according to the holding position of the right hand and the holding pressure of each finger of the left hand on the steering wheel, the relative position of the target position relative to the center position of the current display region of the electronic map is determined, then the electronic map is displayed in a manner of taking the target position as the center, the display region of the electronic map is as shown in FIG. 3D, and the target position is shown by the solid dot in FIG. 3D; further, if the user wants to zoom in a display scale, the user controls the direction and size of the holding pressure of the left hand on the steering wheel, the target display scale is determined to be zoomed in relative to the current display scale, at least according to the holding pressure of the left hand, the zooming in times of the display scale relative to the current display scale are determined, thereby displaying the target display position according to the zooming in times, and the display region of the electronic map is as shown in FIG. 3E.

Figure 4A:
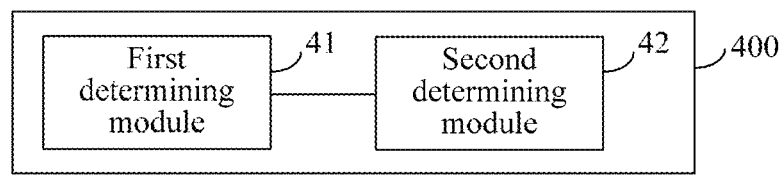
FIG. 4A is a structural schematic diagram of an interaction apparatus embodiment provided by the present invention.

FIG. 4A is a structural schematic diagram of an interaction apparatus embodiment provided by the present invention. As shown in FIG. 4A, the interaction apparatus 400 comprises:

a first determining module 41, configured to determine a holding position of at least one first hand and a holding pressure of at least one second hand on a steering wheel of a vehicle; and a second determining module 42, configured to, at least according to the holding position of the at least one first hand and the holding pressure of the at least one second hand, determine a target relative position.

In the present embodiment, the vehicle can be a vehicle in any type with a steering wheel.

In the present embodiment, the steering wheel is round or approximately round.

In the present embodiment, the at least one first hand and the at least second hand usually belong to a same user, who operates the steering wheel, namely a driver of the vehicle. Optionally, the at least one first hand is one hand of the user, or both hands of the user; the at least one second hand is one hand of the user, or both hands of the user. When the at least first hand is both hands of the user, each hand has one holding position; when the at least second hand is both hands of the user, each hand has at least one holding pressure.

It should be noted that the first hand and second hand are merely intended to differentiate the holding position or holding pressure of the hand, and each hand of the user can be the first hand, or the second and or both the first hand and the second hand. Specifically, the at least one first hand is same as or different from the at least one second hand. For example, the holding position of one hand and the holding pressure of the two hands of the user on the steering wheel, or the holding position of the two hands and the holding pressure of one hand of the user, or the holding position of the two hands and the holding pressure of the two hands of the user, or the holding position of one hand and the holding pressure of the hand of the user, or the holding position of one hand and the holding pressure of the other hand of the user are determined by the first determining module 41.

In the present embodiment, the first determining module 41 has many manners to determine the holding position of the at least one first hand and the holding pressure of the at least one second hand, for example, at least one pressure sensor is arranged at the edge of the steering wheel, etc.

In the present embodiment, the target relative position is a relative position of a target position relative to a reference position, and the target relative position is the position that the user with the at least one first hand and at least one second hand wants to select. Specifically, the target position and the reference position can be an object in any type, for example a vehicle, a person, a building or a road.

In the present embodiment, the target relative position is related to the holding position of the at least one first hand and the holding pressure of the at least one second hand, specifically, when the holding position of the at least one first hand and/or the holding pressure of the at least one second hand are different, the target relative positions determined by the second determining module 42 are correspondingly different.

According to the interaction apparatus in the present embodiment, by determining a holding position of at least one first hand and a holding pressure of at least one second hand on a steering wheel of a vehicle; and at least according to the holding position of the at least one first hand and the holding pressure of the at least one second hand, determining a target relative position, there is provided an interaction solution, specifically, a target position that a user wants to select is determined according to the holding position and the holding pressure that the user holds the steering wheel without excessively increasing a burden of the user, and the driving safety is improved.

The interaction apparatus 400 of the present embodiment is further described by some optional implementing manners.

In the present embodiment, the holding pressure of the at least one second hand can be the holding pressure of different parts in the at least one second hand.

In one possible scenario, the holding pressure of at least one second hand comprises: a holding pressure of at least one finger of the at least one second hand; the second determining module 42 is specifically configured to, at least according to the holding position of the at least one first hand and the holding pressure of the at least one finger, determine a target relative position.

Figure 4B:
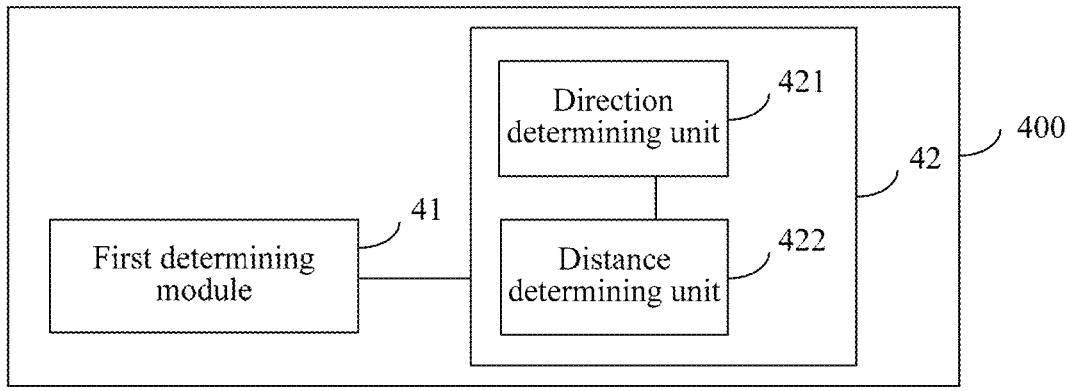
FIGS. 4B-4E are structural schematic diagrams of an implementing manner of the embodiment as shown in FIG. 4A.

In the present scenario, the target relative position is optionally determined by the relative direction and relative distance of the target position relative to the reference position, correspondingly, the two are respectively determined by the holding position and holding pressure. Optionally, as shown in FIG. 4B, the second determining module 42 comprises:

a direction determining unit 421, configured to, at least according to the holding position of the at least one first hand, determine a relative direction of the target relative position; and a distance determining unit 422, configured to, at least according to the holding pressure of the at least one finger, determine a relative distance of the target relative position.

The distance determining unit 422 has many implementing manners.

In one possible implementing manner, the distance determining unit 422 is specifically configured to, at least according to a first number of fingers with the holding pressure exceeding a first threshold in the at least one finger, determine a relative distance of the target relative position.

In the present implementing manner, the at least one second hand is optionally one second hand, then the at least one finger belongs to one hand of the user, or the at least one second hand is two hands of the user, then the at least one finger belongs to two hands of the user. In the scenario that the at least one second hand is two hands of the user, in order to improve a control precision of the user, optionally, the distance determining unit 422 is specifically configured to, in response to that a second number of fingers with the holding pressure exceeding the first threshold in the one of the two second hands equals to a third number of fingers with the holding pressure exceeding the first threshold in the other of the two second hands, and at least according to the second number, determine the relative distance.

In another optional implementing manner, different from the above implementing manner that the distance determining unit 422 adopts the same threshold for the holding pressure of each finger, in the implementing manner, the distance determining unit 422 adopts different thresholds for different fingers. Correspondingly, the distance determining unit 422 is specifically configured to, at least according to a fourth number of fingers with the holding pressure exceeding a second threshold in the at least one finger, determine the relative distance.

In another optional implementing manner, different from the above two implementing manners that the distance determining unit 422 determines the relative distance according to the number of the fingers with the holding pressure exceeding the threshold, in the present implementing manner, the distance determining unit 422 directly determines the relative distance according to the holding pressure. Correspondingly, the distance determining unit 422 is specifically configured to, at least according to an average value of the holding pressure of the at least one finger, determine the relative distance.

Besides the more implementing manners of the distance determining unit 422, the direction determining unit 421 also has many implementing manners, correspondingly, in the scenarios that the first hand is one first hand or two first hands, the direction determining unit 421 has different implementing manners.

In one possible scenario, the at least one first hand is one first hand.

In the scenario, one possible implementing manner is that the direction determining unit 421 is specifically configured to determine that the relative direction is a first projection direction of a first direction pointing to the holding position of the first hand from the center of the steering wheel in a driving plane of the vehicle.

In the scenario, another optional implementing manner is that the direction determining unit 421 is specifically configured to, according to the first direction, a second direction pointing to a twelve o'clock position of the steering wheel in a vehicle straight driving state from the center of the steering wheel and a driving direction of the vehicle, determine the relative direction, wherein a corresponding relation between the relative direction and the driving direction of the vehicle is same as that between the first direction and the second direction.

In one possible scenario, the at least one first hand is two first hands.

In the present scenario, one optional implementing manner is that the direction determining unit 421 is specifically configured to determine that the relative direction is between a second projection direction of a third direction pointing to a first holding position of one of the two first hands from the center of the steering wheel and a third projection direction of a fourth direction pointing to a second holding position of the other of the two first hands from the center of the steering wheel in the driving plane.

In the present scenario, another optional implementing manner is that the direction determining unit 421 is specifically configured to, according to the third direction, the fourth direction and a second direction pointing to a twelve o'clock position of the steering wheel in a vehicle straight driving state from the center of the steering wheel and a driving direction of the vehicle, determine the relative direction, wherein the relative direction is between a fifth direction and a sixth direction, a corresponding relation between the fifth direction and the driving direction of the vehicle is same as that between the third direction and the second direction, and a corresponding relation between the sixth direction and the driving direction of the vehicle is same as that between the fourth direction and the second direction.

Besides the scenario that the holding pressure of the at least one second hand comprises the holding pressure of at least one finger of the at least one second hand, in another possible scenario, the holding pressure of at least one second hand comprises: holding pressure of at least one palm of the at least one second hand;

the second determining module 42 is specifically configured to, at least according to the holding position of the at least one first hand and the holding pressure of the at least one palm, determine a target relative position.

In the present embodiment, the holding position of the at least one first hand is optionally the holding position of one first hand and respective holding positions of two first hands. Further, the first determining module 41 can determine the holding position of each hand according to the holding positions of different parts of the first hand, for example, the holding position of the palm of one first hand is taken as the holding position of the first hand, and the holding position of one finger of the first hand is taken as the holding position of the first hand, or the center of more holding positions of more fingers of one first hand is taken as the holding position of the first hand.

In the present embodiment, the target positions and reference positions relative to each other in the target relative position have many possibilities.

In one possible scenario, the target relative position is a relative position of a target position outside the vehicle relative to the vehicle, that is, the reference position is the vehicle position. In the present scenario, an entity object such as a person, a building or another vehicle optionally exists in the target position.

Figure 4C:
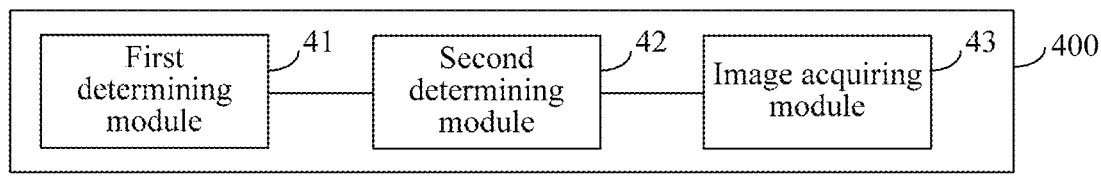

In the present scenario, as shown in FIG. 4C, the interaction apparatus 400 further comprises: an image acquiring module 43, configured to at least according to the target relative position, acquire an image of the target position.

In another possible scenario, the target relative position is a relative position of a target position in an electronic map relative to a reference position in a current display region of the electronic map, wherein the current display region of the electronic map is a region in the electronic map presented on a display screen when the second determining module 21 determines the target relative position; further, the reference position is a center position of the current display region, or the reference position is a position of the vehicle.

Figure 4D:
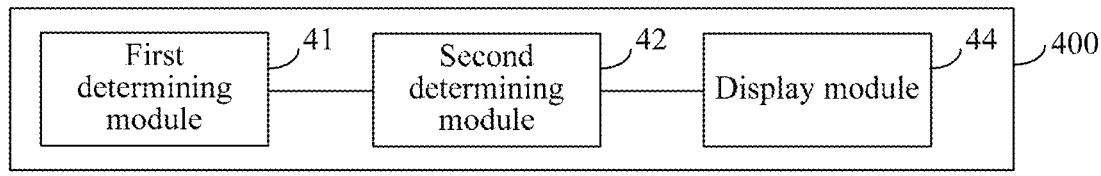

In the present scenario, as shown in FIG. 4D, the interaction apparatus 400 optionally further comprises: a display module 44, configured to display the target position.

Further, the display module 44 is specifically configured to display the electronic map in a manner of taking the target position as a center.

In the scenario, the at least one second hand is one hand or two hands of the user.

Figure 4E:
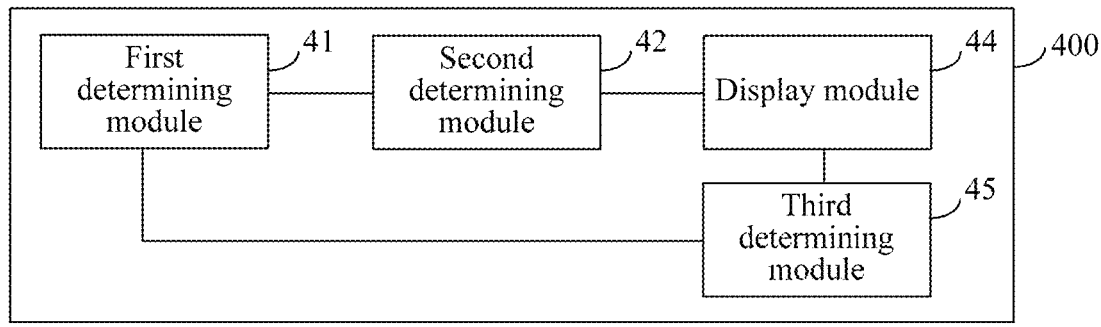

When the at least one second hand is one hand of the user, the display of the target position can be assisted by the other hand of the user, optionally, the first determining module 41 is further configured to determine holding pressure of the other hand of the user on the steering wheel, as shown in FIG. 4E, the interaction apparatus 400 further comprises:

a third determining module 45, configured to, at least according to the holding pressure of the other hand, determine a target display scale of the target position; and the display module 44 is specifically configured to display the target position according to the target display scale.

The third determining module 45 has many implementing manners. Optionally, the third determining module 45 is specifically configured to, at least according to a direction of the holding pressure of the other hand on the steering wheel, determine whether the target display scale is zoomed out or in relative to a current display scale;

at least according to the holding pressure of the other hand, or a number of fingers with the holding pressure exceeding a second threshold in the other hand, determine a zoom factor of the target display scale relative to the current display scale.

Optionally, a direction of the holding pressure of the other hand on the steering wheel points to the inside from the outside of the steering wheel, that is, the other hand presses the steering wheel inwards, or the direction of the holding pressure of the other hand on the steering wheel points to the outside from the inside of the steering wheel, that is, the other hand pulls the steering wheel outwards. Correspondingly, if the direction responding to the holding pressure of the other hand points to the inside from the outside of the steering wheel, the target display scale is determined to be zoomed out relative to the current display scale, if the direction responding to the holding pressure of the other hand points to the outside from the inside of the steering wheel, the target display scale is determined to be zoomed in relative to the current display scale, or if the direction responding to the holding pressure of the other hand points to the inside from the outside of the steering wheel, the target display scale is determined to be zoomed in relative to the current display scale, and if the direction responding to the holding pressure of the other hand points to the outside from the inside of the steering wheel, the target display scale is determined to be zoomed out relative to the current display scale.

Specific implementation of each scenario and each implementing manner of the present embodiment can refer to the corresponding description in the interaction method embodiment provided by the present application.

Figure 5A:
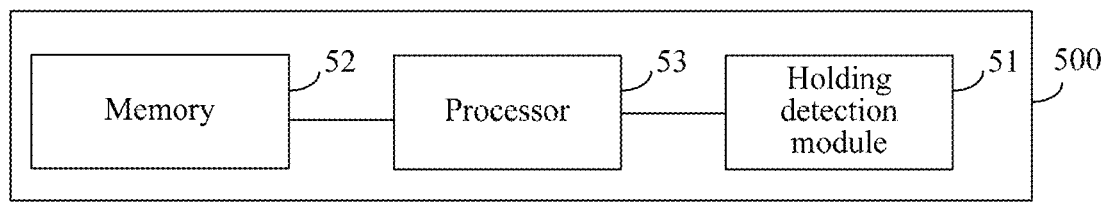
FIG. 5A is a structural schematic diagram of a vehicle-mounted device embodiment provided by the present invention.

FIG. 5A is a structural schematic diagram of a vehicle-mounted device embodiment provided by the present invention. As shown in FIG. 5A, the vehicle-mounted device 500 comprises:

a holding detection module 51, configured to detect a holding position of at least one first hand and a holding pressure of at least one second hand on a steering wheel;

a memory 52, configured to store an instruction;

a processor 53, configured to execute the instruction stored by the memory 52, wherein the instruction causes the processor 53 to execute the following operation:

at least according to the holding position of the at least one first hand and the holding pressure of the at least one second hand, determining a target relative position.

In the present embodiment, the holding detection module 51 optionally comprises at least one pressure sensor. Specifically, the at least one pressure sensor is arranged on the steering wheel.

In the present embodiment, the memory 52 optionally comprises a Random-Access Memory (RAM) and optionally comprises a non-volatile memory, for example a disk memory.

In the present embodiment, the instruction is stored in the memory 52 in a program manner.

In the present embodiment, the processor 53 can be a central processing unit (CPU), or an application specific integrated circuit (ASIC), or configured as one or more integrated circuits that implement above operations. The instruction enabling the processor 53 to execute the operations can refer to corresponding description in the interaction method embodiment and is not repeated herein.

Figure 5B:
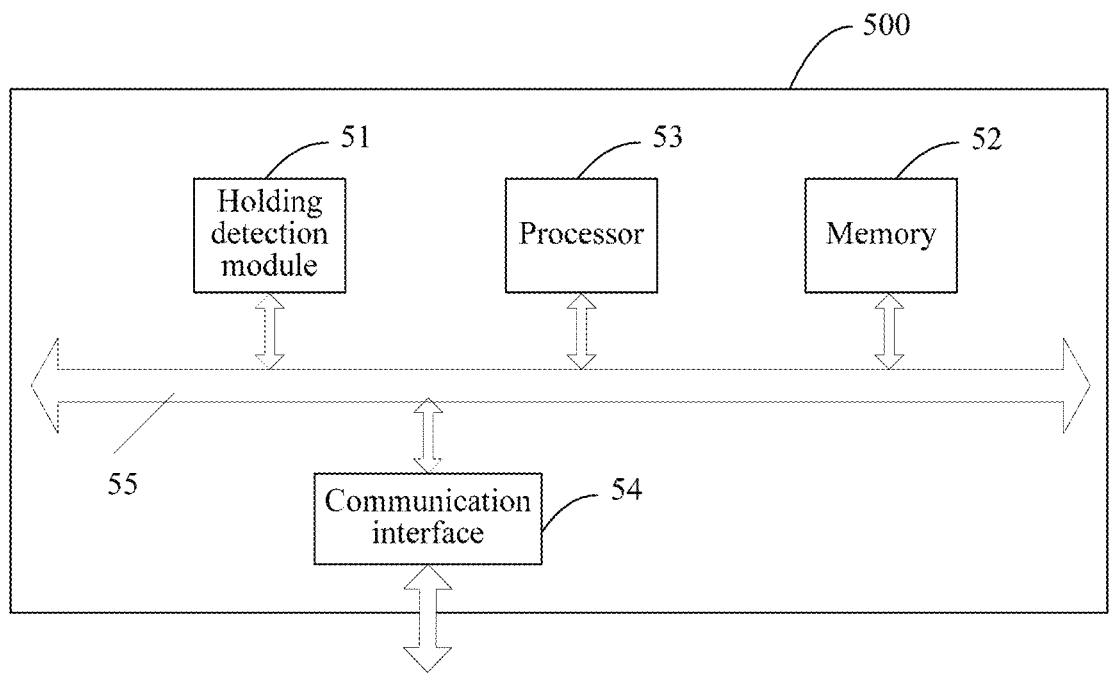
FIG. 5B is a structural schematic diagram of an implementing manner of the embodiment as shown in FIG. 5A.

In the present embodiment, as shown in FIG. 5B, the vehicle-mounted device 500 further comprises a communication interface 54 and a communication bus 55, wherein the communication interface 54 is configured to communicate between the vehicle-mounted device 500 and external devices; and the holding detection module 51, the memory 52, the processor 53, and the communication interface 54 communicate with each other by the communication bus 55.

In the present implementing manner, optionally, the communication interface 54 is configured to acquire sensing data from at least one pressure sensor outside, the at least one pressure sensor is optionally arranged in a steering wheel cover sleeving the steering wheel and replaces the holding detection module 51 to detect the holding position of the at least one first hand and the holding pressure of the at least one second hand on the steering wheel, and the processor 53, before determining the target relative position, executes the following operation: determining the holding position of the at least one first hand and the holding pressure of the at least one second hand on the steering wheel according to the sensing data.

Beneficial effects of the present embodiment refer to corresponding description in the interaction method embodiment provided by the present application.

It can be appreciated by a person of ordinary skill in the art that, exemplary units and method steps described with reference to the embodiments disclosed in this specification can be implemented by electronic hardware or a combination of computer software and electronic hardware. Whether these functions are executed by hardware or software depends on specific applications and design constraints of the technical solution. A person skilled in the art may use different methods to implement the described functions for each specific application, but such implementation should not be construed as a departure from the scope of the present invention.

If the function is implemented in the form of a software functional unit and is sold or used as an independent product, the product can be stored in a computer-readable storage medium. Based on this understanding, the technical solution of the present invention essentially, or the part that contributes to the prior art, or a part of the technical solution may be embodied in the form of a software product; the computer software product is stored in a storage medium and comprises several instructions for enabling a computer device (which can be a personal computer, a server, a network device, or the like) to execute all or some of the steps of the method in the embodiments of the present invention. The foregoing storage medium comprises, but not limited to, a USB flash drive, a removable hard disk, a read-only memory (ROM), a random access memory (RAM), a magnetic disk or light disk and other mediums that can be used for storing a program code.

The foregoing implementations are only used to describe the present invention, but not to limit the present invention. A person of ordinary skill in the art can still make various alterations and modifications without departing from the spirit and scope of the present invention; therefore, all equivalent technical solutions also fall within the scope of the present invention and the patent protection scope of the present invention should be subject to the claims.

What is claimed is:

1. An interaction method, comprising:
determining a holding position of at least one first hand and a holding pressure of at least one second hand on a steering wheel of a vehicle; and at least according to the holding position of the at least one first hand and the holding pressure of the at least one second hand, determining a target relative position, wherein the target relative position is a relative position of a target position relative to a reference position.

2. The method according to claim 1, wherein the holding pressure of at least one second hand comprises: a holding pressure of at least one finger of the at least one second hand;
the at least according to the holding position of the at least one first hand and the holding pressure of the at least one second hand, determining a target relative position comprises:
at least according to the holding position of the at least one first hand and the holding pressure of the at least one finger, determining the target relative position.

3. The method according to claim 2, wherein the at least according to the holding position of the at least one first hand and the holding pressure of the at least one finger, determining a target relative position comprises:
at least according to the holding position of the at least one first hand, determining a relative direction of the target relative position; and
at least according to the holding pressure of the at least one finger, determining a relative distance of the target relative position.

4. The method according to claim 3, wherein the at least according to the holding pressure of the at least one finger, determining a relative distance of the target relative position comprises: at least according to a first number of fingers with the holding pressure exceeding a first threshold in the at least one finger, determining the relative distance.

5. The method according to claim 4, wherein the at least one second hand is two second hands;
the at least according to a first number of fingers with the holding pressure exceeding a first threshold in the at least one finger, determining the relative distance comprises:
in response to that a second number of fingers with the holding pressure exceeding the first threshold in the one of the two second hands equals to a third number of fingers with the holding pressure exceeding the first threshold in the other of the two second hands, at least according to the second number, determining the relative distance.

6. The method according to claim 3, wherein the at least one first hand is one first hand;
the at least according to the holding position of the at least one first hand, determining a relative direction of the target relative position comprises:
determining that the relative direction is a first projection direction of a first direction pointing to the holding position of the first hand from the center of the steering wheel in a driving plane of the vehicle; or
according to the first direction, a second direction pointing to a twelve o'clock position of the steering wheel in a vehicle straight driving state from the center of the steering wheel and a driving direction of the vehicle, determining the relative direction, wherein a corresponding relation between the relative direction and the driving direction of the vehicle is same as that between the first direction and the second direction.

7. The method according to claim 3, wherein the at least one first hand is two first hands;
the at least according to the holding position of the at least one first hand, determining a relative direction of the target relative position comprises:
determining that the relative direction is between a second projection direction of a third direction pointing to a first holding position of one of the two first hands from the center of the steering wheel and a third projection direction of a fourth direction pointing to a second holding position of the other of the two first hands from the center of the steering wheel in the driving plane; or
according to the third direction, the fourth direction and a second direction pointing to a twelve o'clock position of the steering wheel in a vehicle straight driving state from the center of the steering wheel and a driving direction of the vehicle, determining the relative direction, wherein the relative direction is between a fifth direction and a sixth direction, a corresponding relation between the fifth direction and the driving direction of the vehicle is same as that between the third direction and the second direction, and a corresponding relation between the sixth direction and the driving direction of the vehicle is same as that between the fourth direction and the second direction.

8. The method according to claim 1, wherein the holding pressure of the at least one second hand comprises: a holding pressure of at least one palm of the at least one second hand;
the at least according to the holding position of the at least one first hand and the holding pressure of the at least one second hand, determining a target relative position comprises:
at least according to the holding position of the at least one first hand and the holding pressure of the at least one palm, determining the target relative position.

9. The method according to claim 1, wherein the target relative position is the relative position of the target position outside the vehicle relative to the vehicle.

10. The method according to claim 9, further comprising:
at least according to the target relative position, acquiring an image of the target position.

11. The method according to claim 1, wherein the target relative position is the relative position of the target position in an electronic map relative to the reference position in a current display region of the electronic map.

12. The method according to claim 11, wherein the reference position is a center position of the current display region.

13. The method according to claim 11, wherein the reference position is a position of the vehicle.

14. The method according to any one of claims 11-13, further comprising:
displaying the target position.

15. The method according to claim 14, wherein the displaying the target position comprises:
displaying the electronic map in a manner of taking the target position as a center.

16. The method according to claim 14, wherein the at least one second hand is one hand of a user; the method further comprising:
determining a holding pressure of the other hand of the user on the steering wheel;
at least according to the holding pressure of the other hand, determining a target display scale of the target position; and
the displaying the target position comprises: displaying the target position according to the target display scale.

17. The method according to claim 16, wherein the at least according to the holding pressure of the other hand on the steering wheel, determining a target display scale of the target position comprises:

at least according to a direction of the holding pressure of the other hand on the steering wheel, determining whether the target display scale is zoomed out or in relative to a current display scale; and at least according to the holding pressure of the other hand, or a number of fingers with the holding pressure exceeding a second threshold in the other hand, determining a zoom factor of the target display scale relative to the current display scale.

18. The method according to claim 17, wherein a direction of the holding pressure of the other hand on the steering wheel points to the inside from the outside of the steering wheel, or points to the outside from the inside of the steering wheel.

19. An interaction apparatus, comprising:
a first determining module, configured to determine a holding position of at least one first hand and a holding pressure of at least one second hand on a steering wheel of a vehicle; and
a second determining module, configured to, at least according to the holding position of the at least one first hand and the holding pressure of the at least one second hand, determine a target relative position, wherein the target relative position is a relative position of a target position relative to a reference position.

20. The apparatus according to claim 19, wherein the holding pressure of at least one second hand comprises: a holding pressure of at least one finger of the at least one second hand; the second determining module is specifically configured to, at least according to the holding position of the at least one first hand and the holding pressure of the at least one finger, determine the target relative position.

21. The apparatus according to claim 20, wherein the second determining module comprises:
a direction determining unit, configured to, at least according to the holding position of the at least one first hand, determine a relative direction of the target relative position; and
a distance determining unit, configured to, at least according to the holding pressure of the at least one finger, determine a relative distance of the target relative position.

22. The apparatus according to claim 21, wherein the distance determining unit is specifically configured to, at least according to a first number of fingers with the holding pressure exceeding a first threshold in the at least one finger, determine the relative distance of the target relative position.

23. The apparatus according to claim 22, wherein the at least one second hand is two second hands; the distance determining unit is specifically configured to, in response to that a second number of fingers with the holding pressure exceeding the first threshold in the one of the two second hands equals to a third number of fingers with the holding pressure exceeding the first threshold in the other of the two second hands, at least according to the second number, determine the relative distance.

24. The apparatus according to claim 21, wherein the at least one first hand is one first hand; the direction determining unit is specifically configured to
determine that the relative direction is a first projection direction of a first direction pointing to the holding position of the first hand from the center of the steering wheel in a driving plane of the vehicle: or
according to the first direction, a second direction pointing to a twelve o'clock position of the steering wheel in a vehicle straight driving state from the center of the steering wheel and a driving direction of the vehicle, determine the relative direction, wherein a corresponding relation between the relative direction and the driving direction of the vehicle is same as that between the first direction and the second direction.

25. The apparatus according to claim 21, wherein the at least one first hand is two first hands; the direction determining unit is specifically configured to
determine that the relative direction is between a second projection direction of a third direction pointing to a first holding position of one of the two first hands from the center of the steering wheel and a third projection direction of a fourth direction pointing to a second holding position of the other of the two first hands from the center of the steering wheel in the driving plane; or
according to the third direction, the fourth direction and a second direction pointing to a twelve o'clock position of the steering wheel in a vehicle straight driving state from the center of the steering wheel and a driving direction of the vehicle, determine the relative direction, wherein the relative direction is between a fifth direction and a sixth direction, a corresponding relation between the fifth direction and the driving direction of the vehicle is same as that between the third direction and the second direction, and a corresponding relation between the sixth direction and the driving direction of the vehicle is same as that between the fourth direction and the second direction.

26. The apparatus according to claim 19, wherein the holding pressure of the at least one second hand comprises: a holding pressure of at least one palm of the at least one second hand; the second determining module is specifically configured to, at least according to the holding position of the at least one first hand and the holding pressure of the at least one palm, determine the target relative position.

27. The apparatus according to claim 19, wherein the target relative position is the relative position of the target position outside the vehicle relative to the vehicle.

28. The apparatus according to claim 27, further comprising: an image acquiring module, configured to at least according to the target relative position, acquire an image of the target position.

29. The apparatus according to claim 19, wherein the target relative position is the relative position of the target position in an electronic map relative to the reference position in a current display region of the electronic map.

30. The apparatus according to claim 29, wherein the reference position is a center position of the current display region.

31. The apparatus according to claim 29, wherein the reference position is a position of the vehicle.

32. The apparatus according to any one of claims 29-31, further comprising: a display module, configured to display the target position.

33. The apparatus according to claim 32, wherein the display module is specifically configured to display the electronic map in a manner of taking the target position as a center.

34. The apparatus according to claim 32, wherein the at least one second hand is one hand of a user; the first determining module is further configured to determine a holding pressure of the other hand of the user on the steering wheel;
the apparatus further comprises a third determining module, configured to, at least according to the holding pressure of the other hand, determine a target display scale of the target position; and the display module is specifically configured to display the target position according to the target display scale.

35. The apparatus according to claim 34, wherein the third determining module is specifically configured to
- at least according to a direction of the holding pressure of the other hand on the steering wheel, determine whether the target display scale is zoomed out or in relative to a current display scale;
- at least according to the holding pressure of the other hand, or a number of fingers with the holding pressure exceeding a second threshold in the other hand, determine a zoom factor of the target display scale relative to the current display scale.

36. The apparatus according to claim 35, wherein a direction of the holding pressure of the other hand on the steering wheel points to the inside from the outside of the steering wheel, or points to the outside from the inside of the steering wheel.

37. A vehicle-mounted device, comprising:
- a holding detection module, configured to detect a holding position of at least one first hand and a holding pressure of at least one second hand on a steering wheel;
- a memory, configured to store an instruction;
- a processor, configured to execute the instruction stored by the memory, wherein the instruction causes the processor to execute the following operation:
- at least according to the holding position of the at least one first hand and the holding pressure of the at least one second hand, determining a target relative position, wherein the target relative position is a relative position of a target position relative to a reference position.

* * * * *